United States Patent [19]
Wardle

[11] Patent Number: 5,421,171
[45] Date of Patent: Jun. 6, 1995

[54] COOLING APPARATUS

[75] Inventor: David G. Wardle, Tadworth, United Kingdom

[73] Assignee: The BOC Group plc, Windlesham, England

[21] Appl. No.: 197,380

[22] Filed: Feb. 16, 1994

Related U.S. Application Data

[63] Continuation of Ser. No. 984,154, Dec. 2, 1992.

[30] Foreign Application Priority Data

Dec. 4, 1991 [GB] United Kingdom ............... 912581

[51] Int. Cl.⁶ ............................................. F25D 17/06
[52] U.S. Cl. ........................................ 62/373; 62/64; 62/65; 62/79; 62/95; 62/374; 62/332; 165/4; 165/7; 165/8; 165/909
[58] Field of Search ............... 62/64, 65, 79, 95, 373, 62/374, 332; 165/4, 7, 8, 909

[56] References Cited

U.S. PATENT DOCUMENTS

| | | | |
|---|---|---|---|
| 2,723,837 | 11/1955 | Pennington | 62/95 X |
| 3,048,989 | 8/1962 | Morrison | |
| 3,427,820 | 2/1969 | Hart | 62/374 |
| 3,498,070 | 3/1970 | Allen et al. | |
| 3,531,946 | 10/1970 | Hart | 62/332 |
| 3,611,745 | 10/1971 | Schlemmer | 62/374 X |
| 4,092,100 | 5/1978 | Phillips | 165/8 X |
| 4,093,435 | 6/1978 | Marron et al. | 165/8 X |
| 4,403,479 | 9/1983 | Rasovich | 62/374 X |
| 4,426,853 | 1/1984 | Mitani et al. | 165/8 X |
| 4,852,358 | 8/1989 | Acharya et al. | 62/374 X |
| 4,856,285 | 8/1989 | Acharya et al. | 62/332 X |
| 4,858,445 | 8/1989 | Rasovich | 62/332 X |

FOREIGN PATENT DOCUMENTS 0191007 8/1986 European Pat. Off. .
0333959 9/1989 European Pat. Off. .

Primary Examiner—Christopher Kilner
Attorney, Agent, or Firm—David A. Draegert; Larry R. Cassett

[57] ABSTRACT

Cooling apparatus comprises a cooling chamber such as a freezing tunnel having a pipeline for introducing liquid nitrogen into it and an exhaust passage for cold nitrogen vapor. The exhaust passage extends through a rotary regenerative heat exchanger. Downstream of the heat exchanger is a fan operable to draw the exhaust gas through the heat exchanger. A second passage extends through the heat exchanger and is arranged for the flow therethrough of relatively warm air, whereby, in operation, the air is able to transfer heat to the exhaust gas in the heat exchanger.

14 Claims, 1 Drawing Sheet

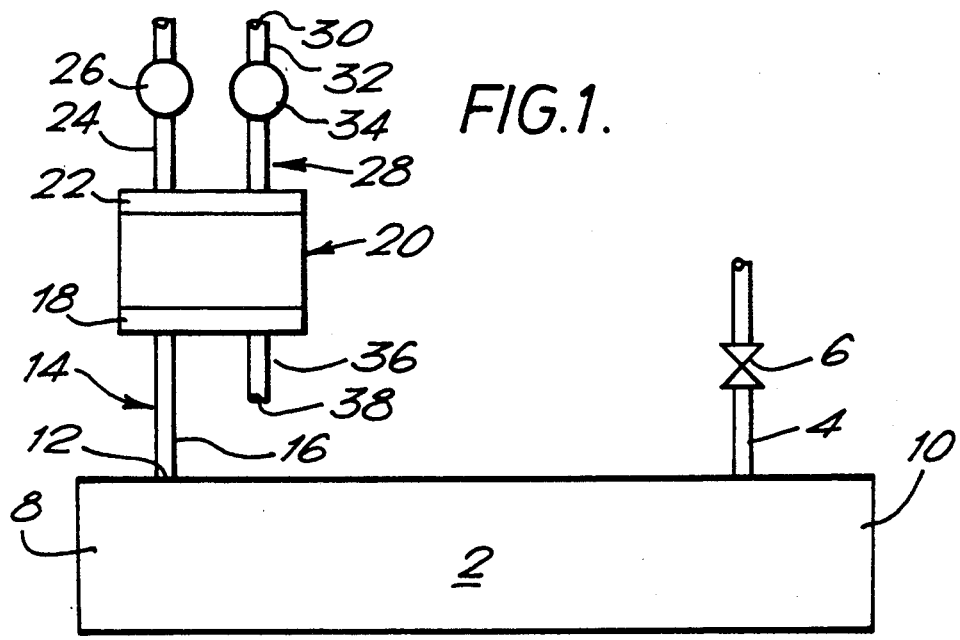
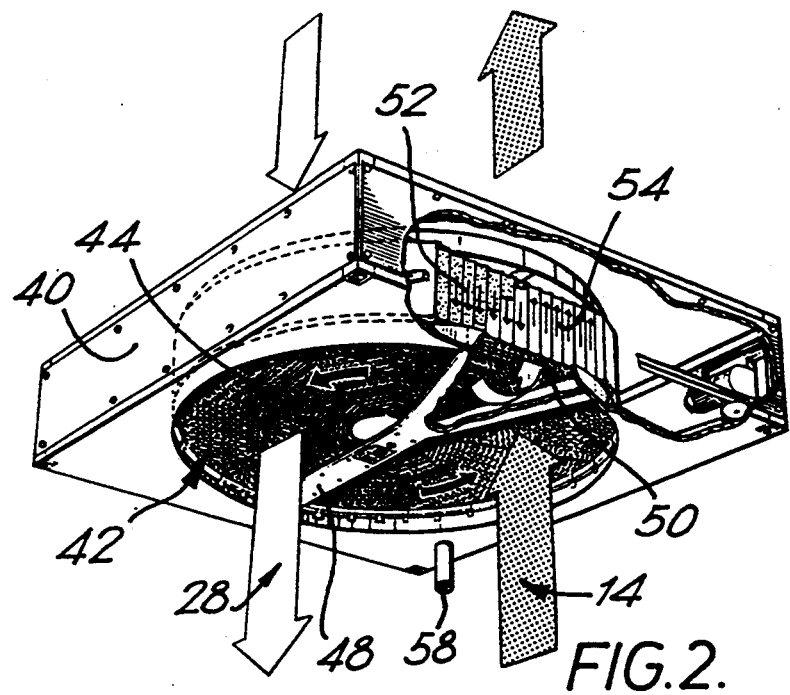
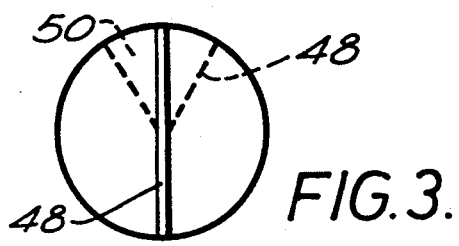

COOLING APPARATUS

This is a continuation of application Ser. No. 07/984,154 filed Dec. 2, 1992.

TECHNICAL FIELD

This invention relates to cooling apparatus, particularly of a kind in which a liquefied gas or its cold vapor is introduced into a chamber to perform a cooling duty and cold vapor is extracted from the chamber.

BACKGROUND OF THE PRIOR ART

Such cooling apparatus is widely used in industry, for example in the freezing of food. A liquefied gas, typically liquid nitrogen, may for example be used to cool food in a tumbler or screw conveyor, or may be used to freeze food in a tunnel or a so-called immersion freezer. In the example of the freezing tunnel, food is advanced on a conveyor through a chamber in the form of a tunnel into which liquid nitrogen is injected. Typically, the liquid nitrogen is directed at the food and extracts heat therefrom as it vaporizes. A fan or fans are employed to provide a flow of cold nitrogen vapor through the tunnel in a direction opposite to that in which the food is advanced through the tunnel and this flow of cold nitrogen vapor is also able to extract heat from the food. In order to prevent or limit the amount of cold nitrogen vapor from spilling out of the ends of the tunnel, a fan is employed to extract the cold nitrogen vapor from the tunnel through an outlet usually positioned in its roof near its entrance. Since liquid nitrogen vaporizes at a temperature of minus 196° C., the temperature of the vapor extracted from the tunnel is typically well below freezing point of water even though there has been heat exchange between the vapor and the food (or other articles or material being advanced through the tunnel). It is therefore a common practice to dilute the extracted vapor with air upstream of the extractor fan so as to increase the temperature of the vapor to above freezing point and thereby avoid deposition of ice on the fan itself. Some dilution takes place in the tunnel since the fan induces a flow of air into the tunnel. However, this dilution is not sufficient to give an adequate increase in temperature. Accordingly, the ducting by which the fan is placed in communication with the outlet from the tunnel is provided with an adjustable inlet for ambient air. Typically, this inlet is designed so as to enable the fan to draw in a flow of ambient air into the ducting at a rate 3 or 4 times that at which the mixture of cold nitrogen vapor and air enters the ducting from the outlet of the freezing tunnel.

There are a number of disadvantages associated with such exhaust gas extractions systems. In particular, the extraction duct needs to be of greater diameter than it would otherwise have to be in order to cope with the induced air flow. Moreover, the refrigerative capacity of the extracted nitrogen vapor is wasted. In addition, if the ambient air has been conditioned, (a common practice in food processing factories), extracting air with the nitrogen vapor effectively reduces the overall efficiency of the air conditioning system. A further disadvantage is that practical problems arise with the control of the extraction system: the operation of the fan is typically linked to a valve controlling the flow of liquid nitrogen into the tunnel. Since the tunnel may be operated with a widely varying range of belt loadings the temperature of the nitrogen vapor at the outlet can vary widely even though the valve is controlled so as to give a desired product temperature at the tunnel exit. Accordingly, in practice, difficulties arise in continuously maintaining the fan free of ice.

SUMMARY OF THE INVENTION

It is an aim of the present invention to provide a cooling apparatus which makes possible amelioration of at least one of the above-described problems with conventional systems.

According to the present invention there is provided cooling apparatus comprising, a cooling chamber, means for introducing liquefied gas or its cold vapor into the chamber, an exhaust passage communicating with an outlet for exhaust gas comprising vapor of the liquefied gas from the cooling chamber, said passage extending through a rotary regenerative heat exchanger, a fan or other means in said exhaust gas passage downstream of the heat exchanger operable to draw exhaust gas through the heat exchanger, a second heat exchange passage extending through the heat exchanger, said second passage being arranged for the flow therethrough of a fluid of higher temperature than the exhaust gas, whereby in operation, the said fluid is able to transfer heat to the exhaust gas in the rotary regenerative heat exchanger.

The heat exchange fluid is preferably a gas. The preferred gas is ambient air. It is possible to heat the exhaust gas to above freezing point so as to prevent the deposition of ice on the fan. Moreover, the heat exchange air may be vented within a factory or room from which it is taken and thus the net rate at which air is extracted from such room or factory with the vapor is reduced in comparison with conventional systems. There is also no need to dilute the extracted gas with air downstream of the outlet thus enabling the diameter of ducting used to define the first passage to be less than in conventional systems.

The cooling apparatus may be of any kind in which a liquefied gas, for example, liquid nitrogen, is used to perform a cooling duty. Thus, for example, the cooling chamber may comprise a tunnel through which articles to be cooled or frozen are advanced on a conveyor.

A rotary regenerative heat exchanger is a device which has a thermally conductive rotor having a multitude of gas flow apertures or pathways therethrough. The apertures or pathways are arranged such that the exhaust gas may be kept to a large extent separate from the heat exchange gas of higher temperature. Any ice deposited by the exhaust gas in apertures or pathways in register with the first passage is able to be melted or sublimed by the heat exchange gas, such pathways or apertures being brought into register with the second passage by virtue of rotation of the rotor. In such an arrangement, residual exhaust gas in the apertures or pathways coming into register with the second passage becomes mixed with the heat exchange gas. If such mixing is not desired, an alternative purging arrangement may be provided in which apertures or pathways through the rotor moving out of register with the first passage are brought into register with a third passage through which a purge gas is able to be passed. The purge gas typically comprises a minor portion of the heat exchange gas which is taken from downstream of the rotor and which is then returned therethrough cocurrently with the exhaust gas.

The rotor may for example comprise an assembly of sheets of corrugated, thermally conductive metal such as aluminum, copper or stainless steel. The rotor is preferably driven by a mechanism such that bearings and like parts are remote from any region in heat exchange relationship with the exhaust gas. For example, there may be a belt drive, with the belt itself being driven from a region remote from the body.

Preferably, if the heat exchange gas is air, the flow of the air through the rotary heat exchanger is, in operation, from 2 to 3 times the volume of the exhaust gas. Preferably the flow of heat exchange gas is created by a fan the second passage upstream of the heat exchanger itself. The arrangement preferably such that the heat exchange gas is provided at a higher pressure than the exhaust gas. Accordingly, any leakage between the first and second passages tends to be from the one conducting the heat exchange gas to the one conducting the exhaust gas. Accordingly, if the heat exchange gas subsequently vented into the room or factory in which the cooling apparatus located, such gas will not be significantly enriched in nitrogen and will not represent any hazard to personnel working in the room or factory.

The speed of the fan in the first passage may be controlled in response to a temperature sensor located at or near the outlet of the cooling chamber. Alternatively, the speed of the fan may be linked to the position of a control valve in a pipeline for supplying liquefied gas (or its cold vapor) to the cooling chamber. Finally, the speed of the fan may be linked to the temperature of the exhaust gas. The fan in the second passage may similarly be controlled.

BRIEF DESCRIPTION OF THE DRAWINGS

The apparatus according to the invention will now be described by way of example with reference to the accompanying drawings, in which:

FIG. 1 is a schematic diagram illustrating an apparatus according to the invention;

FIG. 2 is a schematic perspective view from below the rotor of the rotary heat exchanger forming part of the apparatus shown in FIG. 1;

FIG. 3 is a plan view of the rotor.

DETAILED DESCRIPTION OF THE INVENTION

Referring to the drawings, there is illustrated in FIG. 1 a "liquid nitrogen" freezing tunnel 2. Such freezing tunnels are well known in the art and are readily available commercially, for example, from BOC Limited, Morden, under the trademark BOC CRYOMASTER. Accordingly, the internal configuration and the mode of operation of the freezing tunnel 2 will not be described in detail herein. The freezing tunnel 2 is provided with a liquid nitrogen supply pipeline 4 having a control valve 6 disposed therein. The pipeline 4 communicates with a source of liquid nitrogen (not shown). The tunnel 2 has an entrance 8 and an exit 10. Food products to be frozen are advanced into the tunnel 2 through the entrance 8 and leaves through the exit 10. Within the tunnel 2, the food products come into contact with liquid nitrogen and its cold vapor, the latter flowing countercurrently to the food products, and are thereby frozen. The cold vapor is withdrawn from the tunnel 2 through an outlet 12 in its roof at a region near the entrance 8. The outlet 12 forms one end of a first passage 14. The first passage 14 extends through a first length of ducting 16 to a header 18 on the cold side of a rotary heat exchanger 20. The first passage 14 then extends through the heat exchanger 20 to a header 22 on its warm side and thence through a second length of ducting 24 which terminates at one of its ends in the header 22 and at its other end in a stack (not shown) for safely venting exhaust gas from the freezing tunnel 2 to the atmosphere outside the room in which the tunnel 2 is located.

A fan 26 is disposed in the second length of ducting 24 and is operable to create a flow of exhaust gas from the tunnel 2 through the first passage 14 to the stack (not shown).

In operation of the apparatus shown in FIG. 1, heat exchange takes place between exhaust gas comprising cold vapor extracted from the tunnel 2 and a stream of air introduced into the heat exchanger 20 at a temperature above that at which the exhaust gas is taken from the tunnel 2. Accordingly, the apparatus is provided with a second passage 28 for the flow of the air stream. The passage 28 extends from an inlet 30 through a third length of ducting 32 which terminates in the header 22 on the warm side of the rotary heat exchanger 20. A second fan 34 is located in the ducting 32. The second passage 28 extends through the header 22 and the rotary heat exchanger 20 to the header 18 from where it flows into a fourth length of ducting 36 which terminates in an outlet 38. The inlet 30 of the ducting 32 communicates with the room or factory in which the tunnel 2 is located. The outlet 38 may also communicate with this room or factory or with an air conditioning system which provides appropriately treated air thereto. In operation, there is a flow of heat through the rotary heat exchanger 20 from air passed therethrough by operation of the fan 34 to exhaust gas taken from the tunnel 2 by operation of the fan 26. Accordingly, the exhaust gas can be raised to a temperature above freezing point upstream of the fan 26 and therefore does not deposit ice on any part of the fan 26.

The rotary heat exchanger 20 comprises a generally right cylindrical chamber 40 provided with the header 18 at its lower end and the header 22 at its upper end. A rotor 42 is mounted for rotation within the chamber 40. The disposition of the rotor 42 is such that its axis is vertically orientated. As shown in FIG. 2, the rotor 42 comprises an assembly of a multitude of corrugated sheets 44 formed of heat conductive metal such as aluminum. The rotor 42 is provided with an axial hub which is able to be driven by means (not shown) such as a belt which itself is driven by a motor (not shown) positioned remote from the chamber 40. Sealing members 48 co-operate with the rotor 42 and the walls of the chamber 40 so as to give a desired channelling of gas through the rotor 42 of the heat exchanger 20. As shown in FIG. 2, the member 48 on the cold side of the rotor 42 bifurcates, the space between the two forks being indicated by the reference 50. Referring now to FIG. 3, the corresponding sealing member 48 on the warm side of the rotor 42 does not bifurcate but extends longitudinally. Referring again to FIG. 2, the corrugated sheets 44 which form the rotor 42 are arranged in adjoining segments such that there is no gas communication between the flow pathways in any one segment and those in adjoining segments. Considering now the gas flow pathways through that segment of the rotor 42 which coincides with the space 50 defined by the forks of the sealing member 48 on the cold side of the rotor 42, the gas flow pathways through a first part of this segment (with the rotor in the position shown in FIG. 2) communicate with the third length of ducting 32 and hence conduct gas from the warm side to the cold side of the rotor 42, as shown by the arrows 52 in FIG. 2. Alongside this part, there is a second part of the segment whose gas flow pathways are not in communication with the ducting 32 and therefore do not receive heat exchange air. Accordingly, these second pathways are available for the return flow of air through the rotor 42 from the cold side to the warm side of the heat exchanger 20. This flow is illustrated by the arrows 54 in FIG. 2. It will be appreciated that this return flow emerges from the rotor 42 on the exhaust gas side of the sealing member 48 and therefore becomes mixed with the exhaust gas.

The rotor 42 turns in an anti-clockwise direction. Accordingly, the pathways through the rotor 42 that are presented to the return flow of the heat exchanger air are those which beforehand were in register with the ducting 16 and therefore contain residual exhaust gas. The purge air flow displaces exhaust gas from these pathways.

In the apparatus shown in the drawings, the exhaust gas typically comes into contact with the rotor 42 at a temperature below the freezing point of water and is warmed to a temperature above freezing point as it passes therethrough. There is therefore a tendency for water vapor to condense onto the surfaces of the corrugated sheets 44 forming the rotor 42. As the rotor 42 turns, so those pathways onto which water has separated out of the exhaust gas come into register with the heat exchange air. The heat exchange air gives up heat to these pathways and at the same time evaporates or sublimes any water present in liquid or solid state and thereby clears the pathways of water so that there is no build up of ice on the rotor 42. At the same time, the heat exchange air is itself cooled. There is thus a net flow of heat from the heat exchange air to the exhaust gas. In addition, the evaporation of the water helps to humidify the heat exchange air. There is also a tendency for liquid water to become disengaged from the rotor 42 and for this purpose the chamber 40 is provided with a drain 58.

In operation, the fan 34 preferably creates a greater pressure than the fan 26 so as to ensure that if there is any leakage between the rotor 42 and the sealing members 48 or indeed between seals (not shown) provided between the sides of the rotor 42 and the housing, it will be from the heat exchange air passage 28 to the exhaust gas passage 14.

In a typical example of the operation of the apparatus shown in the drawings, the tunnel consumes 3.6 tons per day of liquid nitrogen. Accordingly, 3.6 tons of vapor are formed for extraction by the fan 26. Such vapor is diluted by air drawn in through the entrance 8 to the tunnel 2 to the extent that the total exhaust flow is in the order of 7.2 tons per day. Typically the exhaust enters the heat exchanger 20 at a temperature in the order of minus 15° C., though this temperature does fluctuate according to the loading of the tunnel and other operating parameters. A flow of air through the second gas passage is chosen so as to ensure that by virtue of heat exchange between it and the exhaust gas, the latter leaves the heat exchanger 20 at a temperature of plus 1° C. Typically, assuming an inlet temperature of 12° C. for this air flow and an outlet temperature from the heat exchanger 20 of plus 1° C. for it, the requirements for air are in the order of 12 tons per day. Typically, the rotor 42 is driven at a speed in the range of 1 to 5 revolutions per minute.

In such an example, the fans are not generally operated at a constant speed. Rather, they are linked either to the temperature of exhaust gas or to the position of the valve 6, the general arrangement being such that the fan speeds are adjusted in accordance with changes in the rate of production of exhaust gas. Typically, the flow of purge air is less than 10% of the total air flow created by operation of the fan 34.

Various changes and modifications may be made to the apparatus shown in the drawings. For example, the purge flow of air may be eliminated. Thus the sealing member 48 on the cold side of the rotor 42 may be a longitudinally extending member complementary to that on the warm side of the rotor 42. In another example, the sheets 44 carry a hygroscopic substance in order to enable liquid water to be absorbed from the exhaust gas and then to be evaporated by the heat exchange air. This evaporation enhances the cooling of the heat exchange air.

The chamber forming part of the apparatus according to the invention need not be in the form of a tunnel. It can, for example, alternatively take the form of an enclosure having a trough or other member for holding a volume or bath of liquefied gas through which items to be cooled or frozen may be conveyed in order to effect the cooling or freezing. The chamber may alternatively take the form of a screw conveyor through which items to be cooled or frozen are conveyed. In another alternative embodiment of the apparatus according to the invention the chamber is provided by a tumbling chamber of a tumbler in which, for example, meat is chilled by contact with a liquefied gas or its cold vapor.

Although the invention has been described with reference to specific example, it would be appreciated by those skilled in the art that the invention may be embodied in many other forms.

I claim:

1. Cooling apparatus comprising, a cooling chamber, means for introducing liquefied gas or its cold vapor into the chamber, a first heat exchange passage communicating with an outlet for an exhaust gas comprising vapor of the liquefied gas from the cooling chamber, said first heat exchange passage extending through a rotary regenerative heat exchanger, a first exhaust gas drawing means in said first heat exchange passage downstream of the heat exchanger operable to draw the exhaust gas through the heat exchanger, and a second heat exchange passage extending through the heat exchanger, said second heat exchange passage being arranged for a flow therethrough of a fluid of higher temperature than the exhaust gas, whereby said fluid transfers heat to the exhaust gas in the rotary regenerative heat exchanger.

2. Apparatus as claimed in claim 1, further comprising a second exhaust gas drawing means in said second heat exchange passage for creating said flow of the fluid of higher temperature, said fluid being in a gaseous state.

3. Apparatus as claimed in claim 2, in which the second exhaust gas drawing means creates a higher gas pressure than the first exhaust gas drawing means.

4. Apparatus as claimed in claim 2, in which the said second exhaust gas drawing means is adapted to create a flow of the fluid having a volume from 2 to 3 times the volume of the exhaust gas.

5. Apparatus as claimed in claim 1, in which the chamber is a freezing tunnel adapted to be supplied with liquid nitrogen.

6. Apparatus as claimed in claim 1 wherein at least one of the first and second exhaust gas drawing means comprises a fan.

7. Cooling apparatus comprising a cooling chamber, a room for housing the cooling chamber, means for introducing liquified gas or its cold vapor into the chamber, a first heat exchange passage communicating with an outlet for an exhaust gas comprising vapor of the liquified gas from the cooling chamber, said first heat exchange passage extending through a rotary regenerative heat exchanger, a first exhaust gas drawing means in said first heat exchange passage downstream of the heat exchanger operable to draw exhaust gas through the heat exchanger, and a second heat exchange passage extending through the heat exchanger and comprising an inlet communicating with said room, said second heat exchange passage being arranged for a flow therethrough of a fluid of higher temperature than the exhaust gas, whereby said fluid transfers heat to the exhaust gas in the rotary regenerative heat exchanger.

8. Apparatus as claimed in claim 7 in which the second heat exchange passage further comprises an outlet which communicates with said room.

9. Apparatus as claimed in claim 7 in which said second heat exchange passage further comprises an outlet which communicates with an air conditioning system.

10. Apparatus as claimed in claim 7 in which the chamber is a freezing tunnel adapted to be supplied with liquid nitrogen.

11. Apparatus as claimed in claim 7 further comprising a second exhaust drawing means in said second heat exchange passage for creating said flow of the fluid of higher temperature, said fluid being in a gaseous state.

12. Apparatus as claimed in claim 11 in which the second exhaust gas drawing means creates a higher gas pressure than the first exhaust gas drawing means.

13. Apparatus as claimed in claim 11 in which the second exhaust gas drawing means is adapted to create a flow of the fluid having a volume of from 2 to 3 times the volume of the exhaust gas.

14. Apparatus as claimed in claim 7 in which at least one of the first and second exhaust gas drawing means is a fan.

* * * * *